United States Patent
Botros et al.

(10) Patent No.: US 10,633,466 B2
(45) Date of Patent: Apr. 28, 2020

(54) LOW DENSITY POLYETHYLENE OF HIGH CLARITY, FILM MADE THEREFROM AND A PROCESS FOR PRODUCING SUCH FILM

(71) Applicant: EQUISTAR CHEMICALS, LP, Houston, TX (US)

(72) Inventors: Maged G. Botros, Township, OH (US); Allen L. Brown, Pearland, TX (US); Stephen M. Imfeld, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 113 days.

(21) Appl. No.: 15/890,647

(22) Filed: Feb. 7, 2018

(65) Prior Publication Data

US 2018/0230250 A1 Aug. 16, 2018

Related U.S. Application Data

(60) Provisional application No. 62/459,816, filed on Feb. 16, 2017.

(51) Int. Cl.
| | |
|---|---|
| *C08F 10/02* | (2006.01) |
| *C08K 3/34* | (2006.01) |
| *C08J 5/18* | (2006.01) |
| *C08F 110/02* | (2006.01) |
| *B29C 48/08* | (2019.01) |
| *B29C 48/00* | (2019.01) |
| *B29K 23/00* | (2006.01) |
| *B29K 105/00* | (2006.01) |
| *B29K 509/00* | (2006.01) |

(52) U.S. Cl.
CPC .......... *C08F 10/02* (2013.01); *B29C 48/0018* (2019.02); *B29C 48/08* (2019.02); *C08F 110/02* (2013.01); *C08J 5/18* (2013.01); *C08K 3/34* (2013.01); *B29K 2023/0633* (2013.01); *B29K 2105/0005* (2013.01); *B29K 2105/0094* (2013.01); *B29K 2509/00* (2013.01); *B29K 2995/0063* (2013.01); *B29K 2995/0088* (2013.01); *C08F 2500/08* (2013.01); *C08F 2500/09* (2013.01); *C08F 2500/12* (2013.01); *C08F 2500/17* (2013.01); *C08F 2500/26* (2013.01); *C08J 2323/06* (2013.01)

(58) Field of Classification Search
CPC .......... C08F 1/02; C08F 110/02; B29C 48/08; B29C 48/0018; C08J 5/18; C08K 3/34
USPC .......................................................... 524/586
See application file for complete search history.

(56) References Cited

U.S. PATENT DOCUMENTS

| | | | |
|---|---|---|---|
| 2011/0003129 A1* | 1/2011 | Mandare | B32B 27/32 428/220 |
| 2012/0130019 A1* | 5/2012 | Karjala | C08F 210/16 525/240 |
| 2012/0165481 A1* | 6/2012 | Demirors | C08F 255/10 526/65 |
| 2013/0046061 A1* | 2/2013 | Hermel-Davidock | C08F 10/00 525/240 |
| 2013/0087199 A1* | 4/2013 | Naumovitz | B32B 17/10018 136/259 |
| 2015/0225526 A1* | 8/2015 | Tu | C08J 3/24 521/95 |

* cited by examiner

*Primary Examiner* — Kelechi C Egwim

(57) ABSTRACT

A low density polyethylene composition characterized by having a density in range of 0.91 to 0.94 gm/cm$^3$, a melt index in the range of 1 to 5 g/10 minutes, a gel permeation chromatography branching index in the range of 1.2 to 1, a polydispersity index in the range of 3.5 to 7.5, a viscosity ratio in the range of 0.7 to 1, and a long chain branching frequency greater than zero at a log molecular weight (log(MW)) value in the range of 4 to 5.5. Film formed from the polyethylene compositions with favorable haze and gloss characteristics, and a process for forming such film, are also described.

15 Claims, 2 Drawing Sheets

LOW DENSITY POLYETHYLENE OF HIGH CLARITY, FILM MADE THEREFROM AND A PROCESS FOR PRODUCING SUCH FILM

CROSS-REFERENCE TO RELATED APPLICATIONS

This application is the Non-Provisional patent application, which claims benefit of priority to U.S. Provisional Application No. 62/459,816, filed Feb. 16, 2017, the contents of which are incorporated herein by reference in their entirety.

STATEMENT REGARDING FEDERALLY SPONSORED RESEARCH OR DEVELOPMENT

Not applicable.

FIELD OF THE INVENTION

The subject matter of this disclosure relates to low-density polyethylene compositions, related film products and methods of making such films.

BACKGROUND

This section introduces information from the art that may be related to or provide context for some aspects of the techniques described herein and/or claimed below. This information is background facilitating a better understanding of that which is disclosed herein. Such background may include a discussion of "related" art. That such art is related in no way implies that it is also "prior" art. The related art may or may not be prior art. The discussion is to be read in this light, and not as admissions of prior art.

Low-density polyethylene (also referenced herein as "LDPE") is a well-known thermoplastic with a variety of uses. The ethylene polymer is "low-density" in that it has a density in range of 0.91 to 0.94 gm/cm$^3$. The commercial value of LDPE for use in film applications is often increased if the LDPE has certain properties, such as increased gloss and reduced haze for example. Methods of producing LDPE typically involving use of an autoclave or a tubular reactor (see, e.g., U.S. Pat. Nos. 6,562,915 and 6,844,408), but despite prior improvements in production processes, a need continues to exist for an LDPE composition with improved optical and processability characteristics advantageous in, for example, commercial film applications.

SUMMARY

The subject matter of this disclosure is directed at, amongst other things, addressing the aforesaid need. Thus, in one aspect of the subject matter, there is provided a low density polyethylene composition characterized by at least the following:
  a density in the range of 0.91 to 0.94 gm/cm$^3$,
  a melt index (MI) in the range of 1 to 5 g/10 minutes,
  a gel permeation chromatography branching index (gpcBR) in the range of 1.2 to 1,
  a polydispersity index (Mw/Mn) in the range of 3.5 to 7.5,
  a viscosity ratio in the range of 0.7 to 1, and
  a long chain branching frequency (LCBf) greater than zero at a log molecular weight (log(MW)) value in the range of 4 to 5.5.

In alternative aspects, the density of the composition is in the range of 0.92 to 0.93, or is 0.923. In yet other alternative aspects, the melt index of the composition is in the range of 2 to 3 g/10 minutes. In still further alternative aspects of the invention, the polydispersity index (Mw/Mn) of the composition is in the range of 4 to 7, or is less than 6, or is less than 5. Polydispersity index as used herein means the ratio of weight average molecular weight to number average molecular weight (Mw/Mn) as measured by gel permeation chromatography (GPC).

Another aspect provides a film formed from a low density polyethylene composition according to the foregoing, the low density polyethylene further comprising an antiblock additive, wherein the film at least has a gloss greater than 70 and a haze less than 7. In one particular aspect, the amount of the antiblock additive is in the range of 800 to 1200 ppm.

An alternative aspect provides a film formed from a low density polyethylene composition according to the foregoing in the absence of an antiblock additive, wherein the film at least has a gloss greater than 70 and a haze less than 6.

Another aspect provides a method of producing a film, the method comprising blown film extruding an amount of a low density polyethylene composition in accordance with this disclosure which further comprises an antiblock additive, so as to form a film which at least has a gloss greater than 70 and a haze less than 7. In one particular aspect, the amount of the antiblock additive is in the range of 800 to 1200 ppm.

Still another aspect provides a method of producing a film, the method comprising blown film extruding an amount of a low density polyethylene composition in accordance with this disclosure but in the absence of an antiblock additive, so as to form a film which at least has a gloss greater than 70 and a haze less than 6.

While multiple aspects are disclosed herein, still other aspects will become apparent to those skilled in the art from the following detailed description. As will be apparent, certain aspects, as disclosed herein, may be modified in various obvious ways, all without departing from the spirit and scope of the claims presented below. Accordingly, the drawings and detailed description are to be regarded as illustrative in nature and not restrictive.

BRIEF DESCRIPTION OF DRAWINGS

The claimed subject matter may be understood by reference to the following description taken in conjunction with the accompanying drawings, in which like reference numerals identify like elements, and in which:

Figure 1:
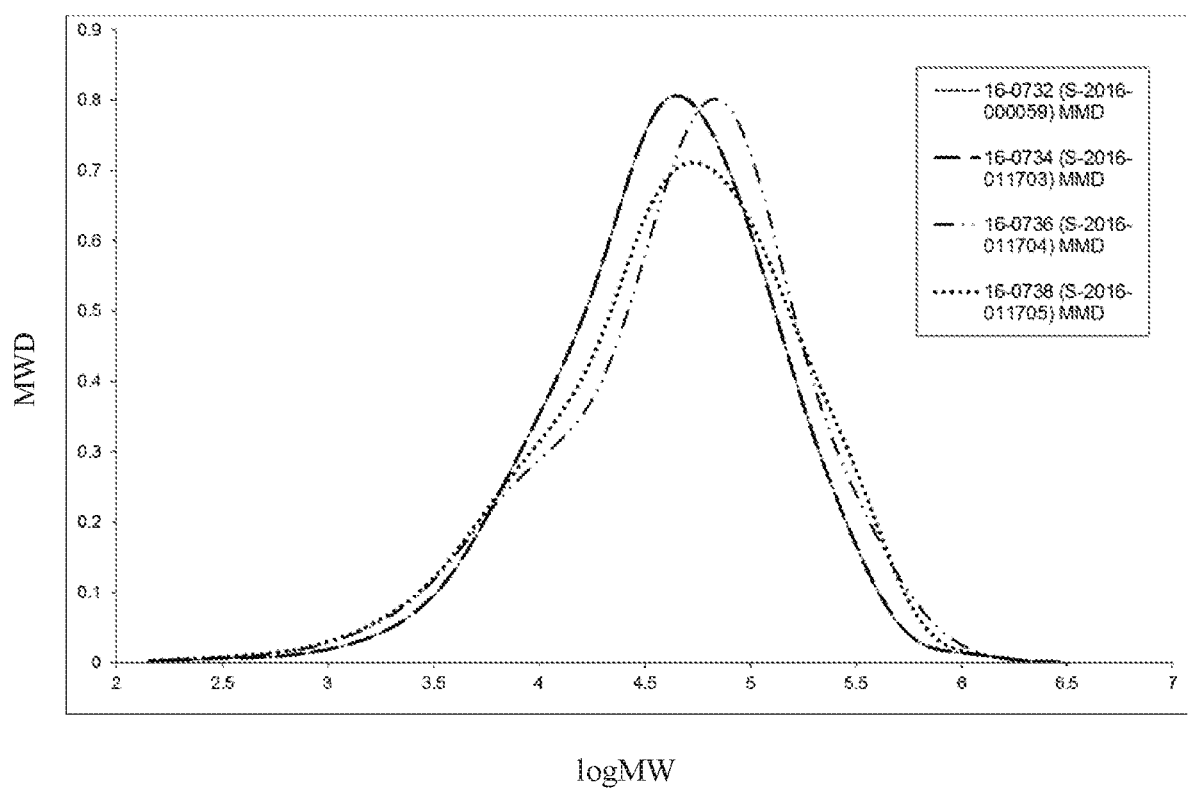
FIG. 1 illustrates the gel permeation chromatography (GPC) molecular weight distributions of two LDPE samples in accordance with one aspect of this disclosure, and of two comparative LDPE samples made using from convention autoclave or tubular reactor processes.

While the claimed subject matter is susceptible to various modifications and alternative forms, the drawings illustrate specific aspects of the subject matter of this disclosure in detail by way of example. It should be understood, however, that the description herein of specific aspects of the invention is not intended to limit the claimed subject matter to the particular forms disclosed, but on the contrary, the intention is to cover all modifications, equivalents, and alternatives falling within the spirit and scope of the appended claims.

DETAILED DESCRIPTION

Illustrative aspects of the subject matter claimed below will now be disclosed. In the interest of clarity, not all features of an actual embodiment or implementation are described in this specification. It will be appreciated that in the development of any such actual embodiment of claimed subject matter, numerous implementation-specific decisions must be made to achieve the developers' specific goals, such as compliance with system-related and business-related constraints, which will vary from one embodiment or implementation to another. Moreover, it will be appreciated that such a development effort, even if complex and time-consuming, would be a routine undertaking for those of ordinary skill in the art having the benefit of this disclosure.

The aspects illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations disclosed herein is to be understood to set forth every number and range encompassed within the broader range of values. It is to be noted that the terms "range" and "ranging" as used herein refer to a value within a specified range and encompass all values within that entire specified range as well as the endpoints of the range, unless otherwise specified explicitly.

Furthermore, various modifications may be made within the scope of the claimed subject matter as herein intended, and aspects thereof may include combinations of features other than those expressly claimed.

Various terms are used herein to describe the subject matter of this disclosure. To the extent a term used in a claim is not explicitly defined in this disclosure, it should be given the broadest definition skilled persons in the pertinent art have given that term as reflected in printed publications and issued patents at the time of filing. Further, unless otherwise specified, compounds described herein may be substituted or unsubstituted and the listing of compounds includes derivatives thereof.

An LDPE composition in accordance with this disclosure will advantageously be produced by a process employing a continuously operated tubular reactor. The polymerization of ethylenically unsaturated monomers will be carried out using, and under conditions suitable for, free-radical polymerization initiators. Examples of initiators are substances that can produce radical species under the conditions in the polymerization reactor, for example, oxygen, air, azo compounds or peroxidic polymerization initiators. In some embodiments of the disclosure the polymerizations are carried out by using oxygen, either fed in the form of pure $O_2$ or as air. In such cases, the initiator may first be mixed with the ethylene feed and then fed to the reactor such that it is not only possible to feed a stream comprising monomer and oxygen to the beginning of the polymerization reactor but also to one or more points along the reactor, thereby creating two or more reaction zones. Initiation using organic peroxides or azo compounds also represents embodiments of the present disclosure. Examples of organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-di-methyl-2,5-di(tert-butyl-peroxy)hex-3-yne, 1,3-diisopropyl monohydroperoxide or tert-butyl hydroperoxide, didecanoyl peroxide, 2,5-dimethyl-2,5-di(2-ethylhexanoylperoxy) hexane, tert-amyl peroxy-2-ethylhexanoate, dibenzoyl peroxide, tert-butyl peroxy-2-ethylhexanoate, tert-butyl peroxy-diethylacetate, tert-butyl peroxydiethylisobutyrate, tert-butyl peroxy-3,5,5-trimethylhexanoate, 1,1 di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl per-oxybenzoate, methyl isobutyl ketone hydroperoxide, 3,6,9 triethyl-3,6,9-trimethyl-triperoxo-cyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2 diphenyl-1,2-dimethylethane derivatives and 1,1,2,2-tetramethylethane derivatives, are additional examples. It is possible to use either individual initiators or mixtures of various initiators. A large range of initiators, such as peroxides, are commercially available, for example the products of Akzo Nobel offered under the trade names Trigonox® or Perkadox®.

Peroxidic polymerization initiators for use in the process include, for example, 1,1-di(tert-butylperoxy)cyclohexane, 2,2-di(tert-butylperoxy)butane, tert butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and in some aspects a particular preference is given to using tert butyl peroxy-3,5,5-trimethylhexanoate, di-(2-ethylhexyl)peroxydicarbonate or tert-butyl peroxy-2-ethylhexanoate.

The initiators can be employed individually or as a mixture in concentrations of 0.1 mol/t to 50 mol/t of polyethylene produced, including 0.1 mol/t to 20 mol/t, in each reaction zone. In some aspects the free-radical polymerization initiator, which is fed to a reaction zone, is a mixture of at least two different azo compounds or organic peroxides. If such initiator mixtures are used they may be fed to all reaction zones. There is no limit to the number of different initiators in such a mixture. In some aspects the mixtures are composed of from two to six different initiators, such as two, three or four different initiators. In certain aspects, the mixtures may comprises initiators which have different decomposition temperatures.

It can be beneficial in some aspects to use the initiators in a dissolved state. Examples of solvents in the dissolution are ketones and aliphatic hydrocarbons, in particular octane, decane and isododecane and also other saturated $C_8$-$C_{25}$-hydrocarbons. The solutions comprise the initiators or initiator mixtures in proportions of 2 to 65% by weight, including 5 to 40% by weight and 8 to 30% by weight.

In some aspects, the polymerization is carried out in the presence of a chain transfer agent. Chain transfer agents are chemical compounds which may interact with a growing polymer chain, terminate the further growth of the growing polymer chain and induce the growth of another growing chain. Accordingly, the molecular weight of the polymers to be prepared can be altered by the addition of chain transfer agents which are also called modifiers or regulators. Examples of chain transfer agents are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol or mixtures of these compounds. The amount of chain transfer agent fed to the tubular reactor is, in certain embodiments, from 0.2 kg/t prepared polymer to 40 kg/t prepared polymer, such as 0.4 kg/t prepared polymer to 20 kg/t prepared polymer. In one embodiment a chain transfer agent comprising at least one aldehyde or at least one ketone is employed and the amount of added aldehydes and ketones is from 0.4 kg/t of prepared polymer to 10 kg/t of prepared polymer.

In a further aspects of this disclosure, propionic aldehyde is used as sole chain transfer agent or the chain transfer agent is a mixture of propionic aldehyde and one or more olefinic hydrocarbons.

The high-pressure polymerization is carried out at pressures in a range from 180 MPa to 340 MPa, for instance at pressures of 200 MPa to 320 MPa. The polymerization temperatures are, in some embodiments, in a range from 100° C. to 350° C., including from 120° C. to 340° C. and from 150° C. to 330° C. In one aspect, the reaction gas composition is fed to the inlet of the tubular reactor and is split into one or more side feeds, normally up to 5 side feeds. The tubular reactor is a multi-zone reactor with up to 7, or alternatively in the range of 3 to 5, reaction zones, and an inner diameter (Di) in the range of 30 to 120 mm. The light-off temperature typically will be in the range of 140 to 220° C.

In the process for producing a film in accordance with this disclosure, the LDPE composition and any additives are introduced to an extruder (e.g., one extruder per layer) where they are melt plastified by heating and then transferred to an extrusion (or coextrusion) die for formation into a tube. Extruder and die temperatures will depend upon the particular resin or mixture being processed and suitable temperature ranges for commercial resins are known in the art, or provided in technical bulletins available from resin manufacturers. Processing temperatures may vary depending upon other process parameters chosen. For example, in extrusion or coextrusion of the polymer blends of the disclosure, barrel and die temperatures may range between about 140° C. and 185° C. However, variations are expected which may depend upon such factors as polymer resin selection, use of other resins e.g. in the blend or in separate layers in a multilayer film, the manufacturing process used and particular equipment and other process parameters utilized. Actual process parameters including process temperatures are expected to be set by one skilled in the art without undue experimentation in view of the present disclosure.

Antiblock additives may be employed in some aspects. The antiblock additives are typical silicate-based materials, including for example sodium-potassium-aluminum silicate materials. One example of such an antiblock additive is Minbloc® HC1400™, available commercially from Unimin Corporation of New Canaan, Conn. The amount of antiblock additive can vary, but in one aspect will be in the range of 800 to 1200 ppm, or will be about 1000 ppm.

EXAMPLES

To facilitate a better understanding of the disclosure, the following examples of embodiments are given. In no way should the following examples be read to limit, or to define, the scope of the appended claims.

For the following examples, the following was used for the gel permeation chromatography (GPC) procedure:

Sample preparation: The sample is dissolved in trichlorobenzene at 160° C. at concentration around 1.8 mg/ml.

Column calibration: A series of 12 narrow molecular weight distribution polystyrene standards of known molecular weight is used to calibrate the column through the relationship between the peak elution volume and the nominal molecular weight.

Testing condition: The sample solution is pumped through a series of column and a detector at flow rate of 1.0 ml/min at 145° C. Upon elution from the column the concentration is measured and the slice data at each elution volume is collected to calculate Mw, Mn and Mz by using the polystyrene calibration and the Mark-Houwink constants for polystyrene and polyethylene.

Viscosity ratio—As used in this disclosure, this value is the ratio of the measured intrinsic viscosity divided by that of the same polymer in linear form at the same molecular weight.

gpcBR—As used in this disclosure, gel permeation chromatography branching index (gpcBR) is defined as:

$$gpcBR = \left(\frac{M_{w,b}}{M_{W,L}}\right)^\alpha \times \left(\frac{[\eta]_L}{[\eta]_b}\right) - 1$$

where $M_{w,b}$ is the bulk weight average molecular weight by light scattering, $M_{W,L}$ is the weight average molecular weight calculated from the concentration detector GPC curve assuming a linear polymer structure, Hb is the bulk intrinsic viscosity by online viscosity detector, HL is the intrinsic viscosity calculated from the concentration detector GPC curve assuming a linear polymer structure using the Mark-Houwink constants, K and α, for linear polyethylene, and α is a Mark-Houwink constant for linear polyethylene.

LCBf (long chain branching frequency) definition—For LCB determinations in the examples below, Zimm-Stockmayer model was used to calculate LCB contents by comparing the Rg-MW relationships between the Cr-resins and a linear reference resin, M6210. As defined by Zimm and Stockmayer, the branching index, gm, is a ratio of the radius of gyration (Rg) of branched polymer to that of linear of the same molecular weight (M), expressed as:

where b and l represent branched and linear polymers, respectively.

At a given $g_M$, the weight-average number of LCB per molecule ($B_{3W}$) can be obtained by using the equation below:

$$g_M = \frac{6}{B_{3w}} \left\{ \frac{1}{2}\left(\frac{2+B_{3w}}{B_{3w}}\right)^{1/2} \ln\left[\frac{(2+B_{3w})^{1/2}+(B_{3w})^{1/2}}{(2+B_{3w})^{1/2}-(B_{3w})^{1/2}}\right] - 1 \right\}$$

where LCB is assumed to be tri-functional (or Y-shaped) and polydisperse. LCB frequency, LCBf(#LCB/1,000 carbons), at $M_i$ can be calculated as:

$$LCBf(\#LCB/1{,}000 \text{ carbons}) = 1000 \times M_o \times B_{3w}/M_i \quad (3)$$

where $M_o$ is the molecular weight of the repeat unit of the polymer in question. For polyethylene, $M_o$ is equal to 14.

Example 1

Two LDPE samples (Samples 1 and 2) of LDPE were obtained from product produced via a continuously operated tubular reactor in accordance with this disclosure. In the tubular reactor process used to form Samples 1 and 2, the peroxides used were t-butyl peroxypivalate, t-butyl peroxy-2-ethylhexanoate, t-butyl peroxyacetate, and di-tert-butyl-peroxide. The reactor pressure ranged from 39,000 psig to 41,000 psig (268,896 to 282,685 kpa) and reactor peak temperatures ranged from 500 to 540° F. (260 to 282° C.). A third comparative sample (Sample 3) was from product formed via an autoclave reactor process and a fourth comparative sample (Sample 4) was from product produced by a conventional tubular reactor process. All of the samples were GPC analyzed and assessed for LCBf according to the procedures set forth above. The resulting GPC curves for these samples are shown on FIG. 1, and the resulting LCBf curves for these samples are shown in FIG. 2. The samples' measured molecular weight data, polydispersity index (Mw/Mn), viscosity ratio and gpcBR characteristics are summarized in Table 1 below.

As can be seen from the data above, LDPE Samples 1 and 2 in accord with this disclosure exhibit distinctively low polydispersity index (Mw/Mn) values below 5.2 as compared to values around 7 or above for comparative Samples 3 and 4. Samples 1 and 2 also show viscosity ratios above 0.74, while comparative Samples 3 and 4 have viscosity ratios of about 0.66, indicating lower long chain branching (LCB) concentration in Samples 1 and 2 compared to comparatives 3 and 4. Samples 1 and 2 also had gpcBR values below 1.02, while comparative Samples 3 and 4 had gpcBR values above 1.3, also indicating lower LCB concentration in Samples 1 and 2 compared to comparatives 3 and 4.

Figure 2:
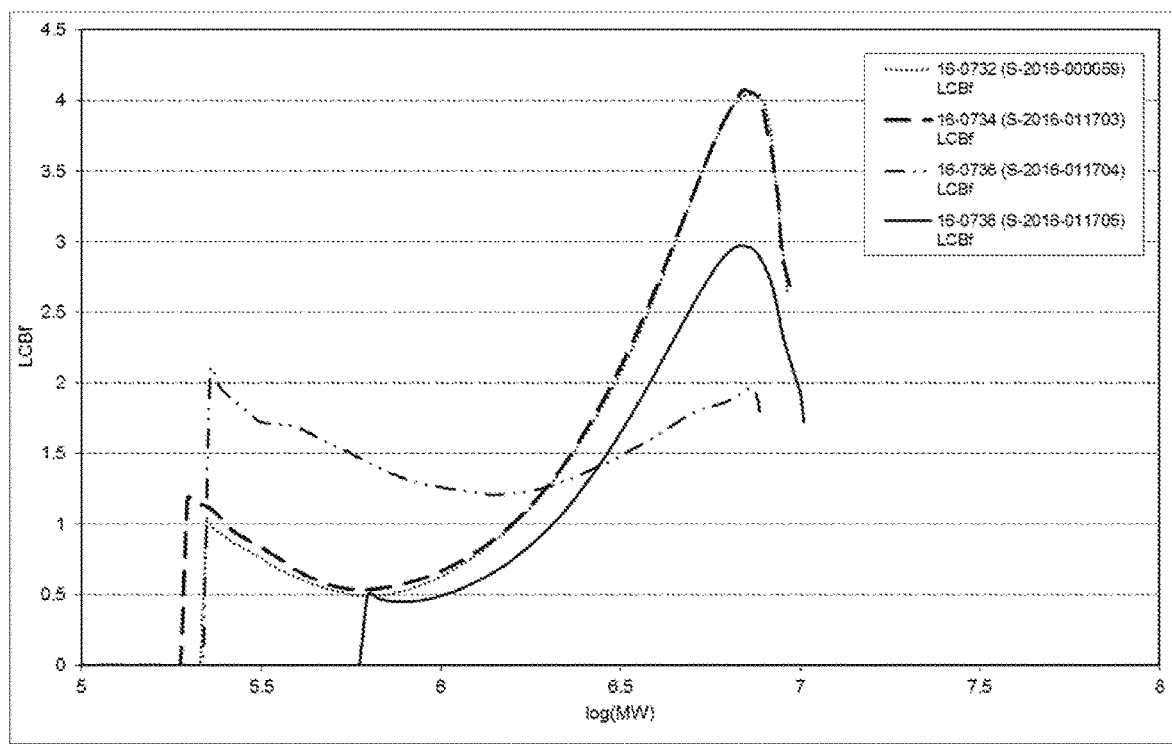
FIG. 2 is a plot of the long chain branching frequency (LCBf) values across the molecular weight distributions of two LDPE composition samples in accordance with one aspect of this disclosure and two comparative LDPE composition samples.

Furthermore, FIG. 1 illustrates that Samples 1 and 2 largely overlapped and exhibited GPC molecular weight distributions which were largely monomodal and relatively narrow, as compared to the broader, somewhat biomodal distributions of comparative Samples 3 and 4. In addition, the long chain branching frequencies (LCBf) plotted on FIG. 2 indicate that Samples 1 and 2 had long chain branching across a broader set of molecular weight values, as compared to comparative Sample 4, exhibiting a long chain branching frequency greater than zero at a log molecular weight (log(MW)) value in the range of 4 to 5.5, while still showing long chain branching frequency values above 2 at log MW values at or above 6.5.

Example 2

Blown film samples (2 mil or 0.051 mm) were produced using an LDPE composition according to this disclosure from Example 1 (Sample 1) and the comparative LDPE compositions from Example 1 (Samples 3 and 4), both with and without antiblock additive (Memblock HB1400™, 1000 ppm), on a blown film line using the following processing conditions:

25 mil (0.635 mm) die gap
2.5:1 BUR (blowup ratio)
Temperature profile: Zone 1-300° F. (148.9° C.), Zone 2-330° F. (165.6° C.), Zone 3 360° F. (182.2° C.), Zone

TABLE 1

| Sample Number | Product and Batch Number | Melt Index (MI) (g/10 minutes) | Density (g/cc) | Mw (g/mol) | Mn (g/mol) | Mw/Mn | Mz (g/mol) | Viscosity Ratio | gpcBR |
|---|---|---|---|---|---|---|---|---|---|
| 1 [16-0732 (S-2016-000059)] | NA321210X01 LP315L2403 T | 2.0 | 0.923 | 76200 | 15000 | 5.09 | 253500 | 0.7436 | 1.0115 |
| 2 [16-0734 (S-2016-011703)] | NA321210X01: LP315L2403 T | 2.0 | 0.923 | 76400 | 14800 | 5.16 | 256700 | 0.7438 | 1.0146 |
| 3 [16-0736 (S-2016-011704)] (comparative) | NA345196: CL716B05D1 A | 1.8 | 0.921 | 97000 | 13900 | 6.99 | 297600 | 0.6605 | 1.3039 |
| 4 16-0738 [(S-2016-011705)] (comparative) | M2520 Batch MI415L2601 T | 2.0 | 0.924 | 93300 | 13000 | 7.18 | 285200 | 0.6664 | 1.3062 |

4-370° F. (187.8° C.), Adapter to Die 370° F. (187.8° C.).

60 lbs. (27.2 kg)/hr.

Haze of each of the resulting films was determined in accordance with the ASTM D1003 standard test method. Specular gloss (45°) of each of the resulting films was determined in accordance with the ASTM D2457 standard test method. The haze and gloss results for all of the samples are summarized in Table 2 below. Table 2 also includes the average haze and gloss results for Sample 4.

TABLE 2

| Film Source | Sample 1 NA321013X01 Lot Nbr: LP315L2402 no A/B | Sample 1 NA321210X01 Lot Nbr: LP315L2403 W/A/B | Sample 3 NA345013 Lot Nbr: CL80041402 no A/B | Sample 3 NA345196 Lot Nbr: CL82062721 W/A/B | Sample 4 M2520 W/A/B | Sample 4 M2520 W/A/B | Sample 4 M2520 W/A/B | Sample 4 M2520 W/A/B Averages |
|---|---|---|---|---|---|---|---|---|
| Gloss (45°) | 83 | 76.3 | 86.7 | 80 | 62 | 66 | 67 | 65 |
| Haze | 5.2 | 6.6 | 4.0 | 5.5 | 8.5 | 7.4 | 7.8 | 7.9 |

The following Table 3 compares certain physical properties determined for the film produced from inventive Sample 1 (NA321), over film produced using comparative Sample 3 (NA345).

TABLE 3

| Property | Value Sample 1 NA321013X01 | Value Sample 3 NA345013 | Units | Test Method |
|---|---|---|---|---|
| Tensile Strength at Yield MD (TD) | 1625 (1710) [11204 (11790)] | 1500 (1600) [103424 (11032)] | psi [kPa] | ASTM D882 |
| Tensile Elongation at Break MD (TD) | 325 (605) [2241 (4171)] | 300 (500) [2068 (3447)] | psi [kPa] | ASTM D882 |
| 1% Secant Modulus MD (TD) | 32600 (40000) [224769 (275790)] | 26000 (30000) [179264 (206843)] | psi [kPa] | ASTM D882 |
| Elmendorf Tear Strength MD (TD) | 542 (456) | 360 (200) | g | ASTM D1922 |

These improved properties are critical for clarity film applications such as film packaging applications. The improved mechanical properties of films made from Sample 1 help to maintain package integrity over film made from Sample 3 with higher strength, stiffness, elongation and resistance to tear.

Example 3

Additional comparisons of Sample 1 and Sample 3 from Example 1 were made to ascertain how each performed under varying blown film extruder operating conditions. For these tests, the following process extruder operating parameters were used:
Film Gauge: 2.5 mils
Lay-flat: 39.5 inches (1003 mm)
Blow-up ratio: 3
Die gap: 1.5 mils
Frostline Height: 25 inches (635 mm)
The blown film extruder had the following temperature profile:
Zone 1 352° F. (178° C.)
Zone 2 347° F. (175° C.)
Zone 3 373° F. (189° C.)
Adaptor 376° F. (191° C.)
Die Zone 1 380° F. (193° C.)
Die Zone 2 378° F. (192° C.)
Die Zone 3 380° F. (193° C.)
Die Zone 4 380° F. (193° C.)

Table 4 below summarizes the resulting observations for each of Sample 1 (NA321) and Sample 3 (NA345) at varying rotations per minute (RPM).

TABLE 4

| Property | NA321 | NA345 | NA321 | NA345 | NA321 | NA345 | NA321 | NA345 | NA321 | NA345 | NA321 | NA345 |
|---|---|---|---|---|---|---|---|---|---|---|---|---|
| RPM | 44 | 45 | 41 | 41 | 35 | 36 | 31 | 31 | 26 | 27 | 22 | 23 |
| Total Gels (ppm) | 3569 | 4209 | 4898 | 5608 | 5722 | 5884 | 5825 | 6065 | 5585 | 6760 | 4743 | 6645 |
| Line Speed (fpm) | 89 | 77 | 72 | Not stable | 75 | 67 | 70 | 60 | 65 | 60 | 59 | 55 |
| Extruder Pressure, psi [kPa] | 3820 [26338] | 4295 [29613] | 4037 [27834] | 4101 [28275] | 3379 [23297] | 3794 [26159] | 3113 [21463] | 3481 [240001] | 2837 [19560] | 3165 [21821] | 2552 [17595] | 2837 [19560] |
| Extruder Melt Temp., ° F. (° C.) | 350 (177) | 355 (179) | 357 (181) | 365 (185) | 356 (180) | 360 (182) | 361 (183) | 364 (184) | 366 (186) | 370 (188) | 370 (188) | 375 (191) |
| Comment | Successful production | Failed to continue production due to bubble breathing | Successful production | Failed | Successful production | Successful production | Successful production | Successful production | Successful production | Successful production | Successful production | Successful production |

As can be seen from the above analysis of each of Sample 1 (NA321) and Sample 3 (NA345), Sample 1 was superior in performance with lower gels, faster line speeds and lower extruder pressures and melt temperatures at comparable RPMs. Faster line speeds are often commercially advantageous, lower temperature is desired for cost savings, and lower temperatures and pressures provide extra room to process the resin at even higher/faster line speeds. In fact, as can be seen from Table 5 below, Sample 1 was superior in performance as compared to Sample 3 at even higher lines speeds as well.

TABLE 5

| Property | NA321 | NA345 | NA321 | NA345 |
|---|---|---|---|---|
| RPM | 52 | | 56 | |
| Line Speed (fpm) | 97 | | 109 | |
| Extruder Pressure, psi | 4210 | | 4397 | |
| Extruder Melt Temperature, F. | 347 | | 346 | |

TABLE 5-continued

| Property | NA321 | NA345 | NA321 | NA345 |
|---|---|---|---|---|
| Comment | Successful production | Failed (could not form a bubble) | Successful production | Failed (could not form a bubble) |

While the foregoing is directed to embodiments of the subject matter of this disclosure, other and further embodiments may be devised without departing from the basic scope thereof and the scope thereof is determined by the claims that follow.

What is claimed is:

1. A low density polyethylene composition characterized by at least the following:
   a density in range of 0.91 to 0.94 g/cm$^3$,
   a melt index (MI) in the range of 1 to 5 g/10 minutes,
   a gel permeation chromatography branching index (gpcBR) in the range of 1.2 to 1,
   a polydispersity index (Mw/Mn) in the range of 3.5 to 7.5,
   a viscosity ratio in the range of 0.7 to 1, and
   a long chain branching frequency (LCBf) greater than zero at a log molecular weight (log(MW)) value in the range of 4 to 5.5.

2. The composition of claim 1, wherein the density is in the range of 0.92 to 0.93 g/cm$^3$.

3. The composition of claim 1, wherein the melt index is in the range of 2 to 3 g/10 minutes.

4. The composition of claim 1, wherein the polydispersity index (Mw/Mn) is in the range of 4 to 7.

5. The composition of claim 4, wherein the polydispersity index (Mw/Mn) is less than 6.

6. The composition of claim 5, wherein the polydispersity index (Mw/Mn) is less than 5.

7. The composition of claim 4, wherein the melt index is in the range of 2 to 3 g/10 minutes.

8. The composition of claim 7, wherein the polydispersity index (Mw/Mn) is less than 6.

9. The composition of claim 8, wherein the polydispersity index (Mw/Mn) is less than 5.

10. A film formed from a low density polyethylene composition according to claim 1, the low density polyethylene composition further comprising an antiblock additive, wherein the film at least has a gloss greater than 70 and a haze less than 7.

11. The film according to claim 10, wherein the amount of the antiblock additive is in the range of 800 to 1200 ppm.

12. A film formed from a low density polyethylene resin according to claim 1 in the absence of an antiblock additive, wherein the film at least has a gloss greater than 70 and a haze less than 6.

13. A method of producing a film, the method comprising blown film extruding an amount of a low density polyethylene composition in accordance with claim 1 which further comprises an antiblock additive, so as to form a film which at least has a gloss greater than 70 and a haze less than 7.

14. The method according to claim 13, wherein the amount of the antiblock additive is in the range of 800 to 1200 ppm.

15. A method of producing a film, the method comprising blown film extruding an amount of a low density polyethylene composition in accordance with claim 1 in the absence of an antiblock additive, so as to form a film which at least has a gloss greater than 70 and a haze less than 6.

* * * * *

UNITED STATES PATENT AND TRADEMARK OFFICE
CERTIFICATE OF CORRECTION

PATENT NO. : 10,633,466 B2
APPLICATION NO. : 15/890647
DATED : April 28, 2020
INVENTOR(S) : Botros et al.

It is certified that error appears in the above-identified patent and that said Letters Patent is hereby corrected as shown below:

In the Specification

In Column 6, Line 42, delete "Hb" and insert -- $[\eta]_b$ --, therefor

In Column 6, Line 43, delete "HL" and insert -- $[\eta]_L$ --, therefor

Signed and Sealed this
Third Day of January, 2023

Katherine Kelly Vidal
*Director of the United States Patent and Trademark Office*